(12) United States Patent
Shimada

(10) Patent No.: US 8,926,027 B2
(45) Date of Patent: Jan. 6, 2015

(54) VEHICLE BRAKING SYSTEM

(75) Inventor: Takashi Shimada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 16 days.

(21) Appl. No.: 13/290,127

(22) Filed: Nov. 7, 2011

(65) Prior Publication Data

US 2012/0112525 A1    May 10, 2012

(30) Foreign Application Priority Data

Nov. 8, 2010    (JP) ................................. 2010-249646

(51) Int. Cl.

| | | |
|---|---|---|
| *B60T 13/16* | (2006.01) | |
| *B60T 7/04* | (2006.01) | |
| *B60T 8/40* | (2006.01) | |
| *B60T 8/44* | (2006.01) | |
| *B60T 13/66* | (2006.01) | |
| *B60T 13/68* | (2006.01) | |
| *B60T 13/74* | (2006.01) | |
| *B60T 17/22* | (2006.01) | |

(52) U.S. Cl.
CPC ............... *B60T 7/042* (2013.01); *B60T 8/4081* (2013.01); *B60T 8/442* (2013.01); *B60T 13/662* (2013.01); *B60T 13/686* (2013.01); *B60T 13/745* (2013.01); *B60T 17/22* (2013.01)
USPC ............. 303/10; 303/20; 303/115.2; 303/155

(58) Field of Classification Search
USPC ................................... 303/10, 20, 115.2, 155
See application file for complete search history.

(56) References Cited

U.S. PATENT DOCUMENTS

| | | | | |
|---|---|---|---|---|
| 5,332,303 | A * | 7/1994 | Wupper | 303/116.1 |
| 6,106,080 | A * | 8/2000 | Tozu et al. | 303/116.1 |
| 7,488,047 | B2 * | 2/2009 | Hatano et al. | 303/122.09 |
| 8,226,176 | B2 | 7/2012 | Hatano | |
| 2006/0082217 | A1 * | 4/2006 | Hatano et al. | 303/122 |
| 2008/0079309 | A1 * | 4/2008 | Hatano et al. | 303/113.5 |
| 2008/0150352 | A1 * | 6/2008 | Nakamura et al. | 303/20 |

(Continued)

FOREIGN PATENT DOCUMENTS

| | | |
|---|---|---|
| DE | 10316750 A1 * | 10/2004 |
| JP | 2008-184057 | 8/2008 |

(Continued)

OTHER PUBLICATIONS

Japanese Office Action for corresponding JP Application No. 2010-249646, Oct. 16, 2012.

*Primary Examiner* — Thomas Irvin
*Assistant Examiner* — Mahbubur Rashid
(74) *Attorney, Agent, or Firm* — Mori & Ward, LLP

(57) ABSTRACT

A vehicle braking system includes an operation amount detector, a hydraulic pressure source, a controller, and a wheel cylinder. The hydraulic pressure source is to generate brake hydraulic pressure corresponding to an amount of operation detected by the operation amount detector. The wheel cylinder is to be operated by the brake hydraulic pressure generated by the hydraulic pressure source. The hydraulic pressure source includes a first actuator and a second actuator. The first actuator includes a piston and an electric motor. The electric motor is configured to move the piston forwardly to generate the brake hydraulic pressure. The second actuator includes a pump configured to pressurize brake fluid located downstream of the first actuator. The controller is configured to selectively operate the first actuator and the second actuator based on the amount of operation detected by the operation amount detector.

10 Claims, 11 Drawing Sheets

(56) References Cited

U.S. PATENT DOCUMENTS

| | | |
|---|---|---|
| 2008/0179941 A1 | 7/2008 | Matsushita |
| 2010/0259096 A1* | 10/2010 | Rieth et al. ............ 303/116.1 |
| 2011/0241419 A1* | 10/2011 | Ohkubo et al. ........... 303/9.62 |

FOREIGN PATENT DOCUMENTS

| | | |
|---|---|---|
| JP | 2008-221995 | 9/2008 |
| JP | 2009-137377 | 6/2009 |
| WO | WO 0073116 A1 * | 12/2000 |

* cited by examiner

DURING PRIMARILY VSA BRAKING

VEHICLE BRAKING SYSTEM

CROSS-REFERENCE TO RELATED APPLICATIONS

The present application claims priority under 35 U.S.C. §119 to Japanese Patent Application No. 2010-249646, filed Nov. 8, 2010, entitled "Vehicle braking system." The contents of this application are incorporated herein by reference in their entirety.

BACKGROUND OF THE INVENTION

1. Field of the Invention

The present invention relates to a vehicle braking system.

2. Discussion of the Background

Among such vehicle braking systems of a brake by wire (BBW) type, a vehicle braking system that reduces the size of an electric motor for operating a slave cylinder serving as the hydraulic pressure source in order to reduce the manufacturing cost of the electric motor and performs field-weakening control on the electric motor in order to increase the responsiveness of generation of the brake hydraulic pressure has been developed (refer to, for example, Japanese Unexamined Patent Application Publication No. 2008-184057).

SUMMARY OF THE INVENTION

According to one aspect of the present invention, a vehicle braking system comprises an operation amount detector, a hydraulic pressure source, a controller, and a wheel cylinder. The operation amount detector is configured to detect an amount of operation of a brake pedal. The hydraulic pressure source is to generate brake hydraulic pressure corresponding to the amount of operation detected by the operation amount detector. The controller is configured to control an operation performed by the hydraulic pressure source. The wheel cylinder is to be operated by the brake hydraulic pressure generated by the hydraulic pressure source. The hydraulic pressure source comprises a first actuator and a second actuator. The first actuator includes a piston and an electric motor. The electric motor is configured to move the piston forwardly to generate the brake hydraulic pressure. The second actuator includes a pump configured to pressurize brake fluid located downstream of the first actuator. The controller is configured to selectively operate the first actuator and the second actuator based on the amount of operation detected by the operation amount detector.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
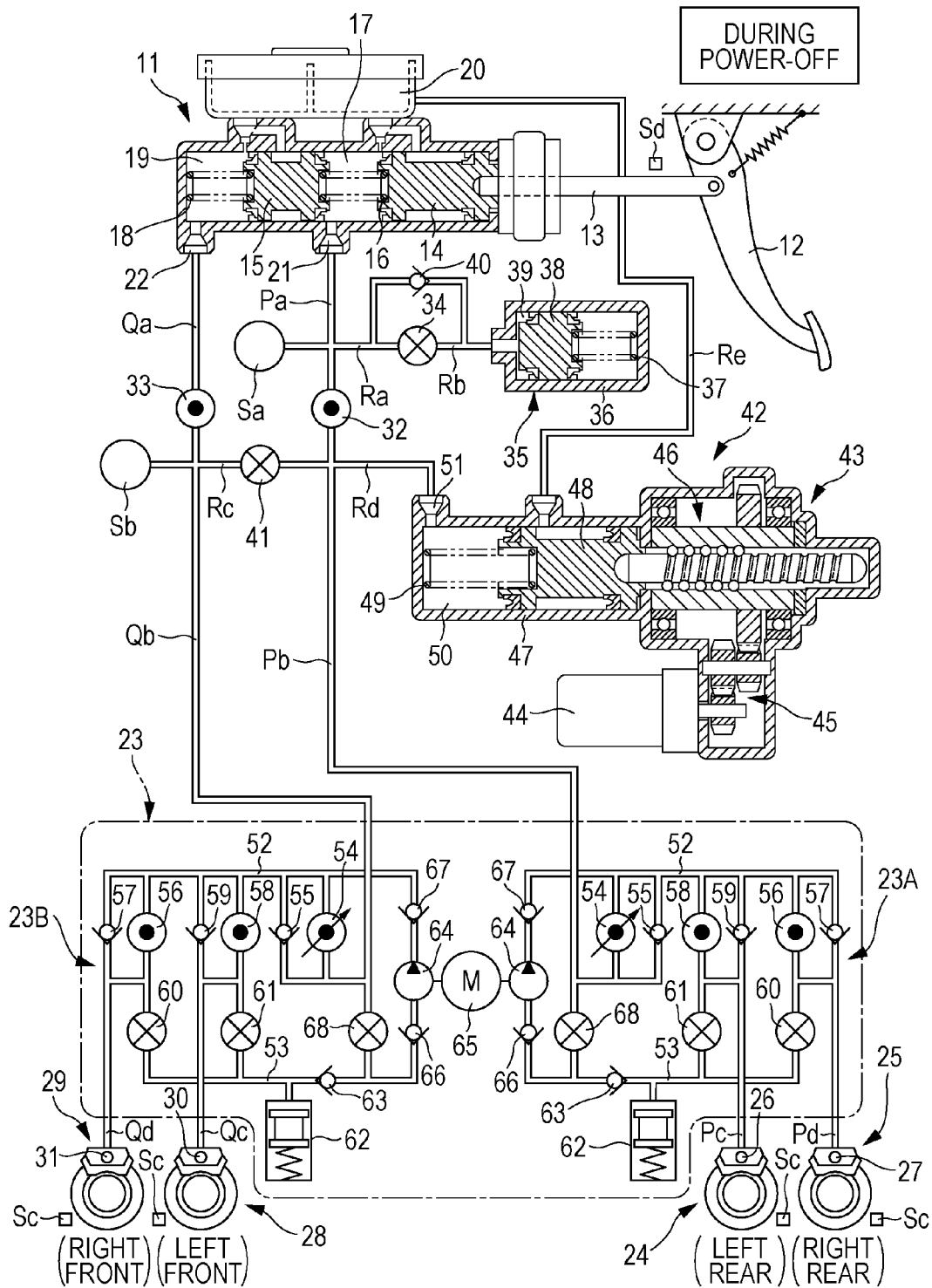
FIG. 1 is a hydraulic pressure circuit diagram of a vehicle braking system during power off according to a first exemplary embodiment of the present invention.

The embodiments will now be described with reference to the accompanying drawings, wherein like reference numerals designate corresponding or identical elements throughout the various drawings.

A first exemplary embodiment of the present invention is described below with reference to FIGS. 1 to 9.

As shown in FIG. 1, a tandem master cylinder 11 includes a first piston 14 connected, via a pushrod 13, to a brake pedal 12 operated by a driver and a second piston 15 disposed in front of the first piston 14. A first hydraulic pressure chamber 17 including a return spring 16 between the first piston 14 and the second piston 15 is partitioned, and a second hydraulic pressure chamber 19 including a return spring 18 in front of the second piston 15 is partitioned. The first hydraulic pressure chamber 17 and the second hydraulic pressure chamber 19 can communicate with a reservoir 20. The first hydraulic pressure chamber 17 and the second hydraulic pressure chamber 19 include a first output port 21 and a second output port 22, respectively. The first output port 21 is connected to, for example, wheel cylinders 26 and 27 (a first channel system) of left and right rear disc brake units 24 and 25 via fluid pathways Pa and Pb, a vehicle stability assist (VSA) unit 23, and fluid pathways Pc and Pd. In addition, the second output port 22 is connected to, for example, wheel cylinders 30 and 31 (a second channel system) of left and right front disc brake units 28 and 29 via fluid pathways Qa and Qb, the VSA unit 23, and fluid pathways Qc and Qd.

Note that as used herein, the term "upstream side" of the fluid pathways Pa to Pd and the fluid pathways Qa to Qd refers to a side adjacent to the master cylinder 11, and the term "downstream side" of the fluid pathways Pa to Pd and the fluid pathways Qa to Qd refers to a side adjacent to the wheel cylinders 26 and 27 and the wheel cylinders 30 and 31.

A first master cut valve 32 formed as a normally open solenoid valve is disposed between the fluid pathways Pa and Pb, and a second master cut valve 33 formed as a normally open solenoid valve is disposed between the fluid pathways Qa and Qb. Fluid pathways Ra and Rb that branch from the fluid pathway Pa located on the upstream side of the first master cut valve 32 are connected to a stroke simulator 35 via a simulator valve 34 formed as a normally closed solenoid valve. The stroke simulator 35 is formed from a cylinder 36 and a piston 38. The piston 38 is slidably fitted into the cylinder 36 and is biased by a spring 37. A hydraulic pressure chamber 39 formed on the opposite side of the piston 38 from the spring 37 communicates the fluid pathway Rb. A check valve 40 disposed parallel to the simulator valve 34 is connected to the simulator valve 34. The check valve 40 allows brake fluid to flow only from the stroke simulator 35 to the fluid pathway Pa.

A third fluid pathway Rc connects the fluid pathway Pb located downstream of the first master cut valve 32 to the fluid pathway Qb located downstream of the second master cut valve 33. A communication control valve 41 formed as a normally closed solenoid valve is disposed in third fluid pathway Rc. A slave cylinder 42 is connected to a fluid pathway Rd that branches from the fluid pathway Pb. An actuator 43 that operates the slave cylinder 42 transfers the rotation of an electric motor 44 to a ball screw mechanism 46 via a gear train 45. The slave cylinder 42 has a cylinder body 47 connected to the reservoir 20 of the master cylinder 11 via a fluid pathway Re. A piston 48 is slidably fitted into the cylinder body 47. The piston 48 is biased by a return spring 49 in the retreat direction. If the piston 48 is driven by the ball screw mechanism 46 of the actuator 43 in the direction of forward movement, the brake hydraulic pressure generated in a hydraulic pressure chamber 50 is transferred to the fluid pathway Rd via an output port 51.

An existing structure is used for the VSA unit 23. The same structure is used for a first brake actuator 23A that controls the first channel system of the left and right rear disc brake units 24 and 25 and a second brake actuator 23B that controls the second channel system of the left and right front disc brake units 28 and 29.

Accordingly, only the first brake actuator 23A of the first channel system of the left and right rear disc brake units 24 and 25 is described below.

The first brake actuator 23A is disposed between the fluid pathway Pb that communicates with the first master cut valve 32 located on the upstream side and the fluid pathways Pc and Pd that communicate with the wheel cylinders 26 and 27, respectively, located on the downstream side.

The first brake actuator 23A includes fluid pathways 52 and 53 that are shared by the wheel cylinders 26 and 27 for the left and right rear wheels. The first brake actuator 23A further includes a regulator valve 54 that is disposed between the fluid pathway Pb and the fluid pathway 52 and that is formed as a normally-open variable solenoid valve, a check valve 55 that is disposed parallel to the regulator valve 54 and that allows brake fluid to flow from the fluid pathway Pb to the fluid pathway 52, an in-valve 56 that is disposed between the fluid pathway 52 and the fluid pathway Pd and that is formed as a normally-open variable solenoid valve, a check valve 57 that is disposed parallel to the in-valve 56 and that allows brake fluid to flow from the fluid pathway Pd to the fluid pathway 52, an in-valve 58 that is disposed between the fluid pathway 52 and the fluid pathway Pc and that is formed as a normally open solenoid valve, a check valve 59 that is disposed parallel to the in-valve 58 and that allows brake fluid to flow from the fluid pathway Pc to the fluid pathway 52, an out-valve 60 that is disposed between the fluid pathway Pd and the fluid pathway 53 and that is formed as a normally closed solenoid valve, an out-valve 61 that is disposed between the fluid pathway Pc and the fluid pathway 53 and that is formed as a normally closed solenoid valve, a reservoir 62 connected to the fluid pathway 53, a check valve 63 that is disposed between the fluid pathway 53 and the fluid pathway Pb and that allows the brake fluid to flow from the fluid pathway 53 to the fluid pathway Pb, a pump 64 that is disposed between the fluid pathway 52 and the fluid pathway 53 and that supplies the brake fluid from the fluid pathway 53 to the fluid pathway 52, an electric motor 65 for driving the pump 64, check valves 66 and 67 that are disposed on the inlet and outlet sides of the pump 64 and that prevent the brake fluid from flowing back, and a suction valve 68 that is disposed between the middle point between the check valve 63 and the pump 64 and the fluid pathway Pb and that is formed as a normally closed solenoid valve.

Note that the electric motor 65 is shared by the pumps 64 of the first brake actuator 23A and the second brake actuator 23B. However, a dedicated electric motor 65 can be provided for each of the pumps 64.

Figure 2:
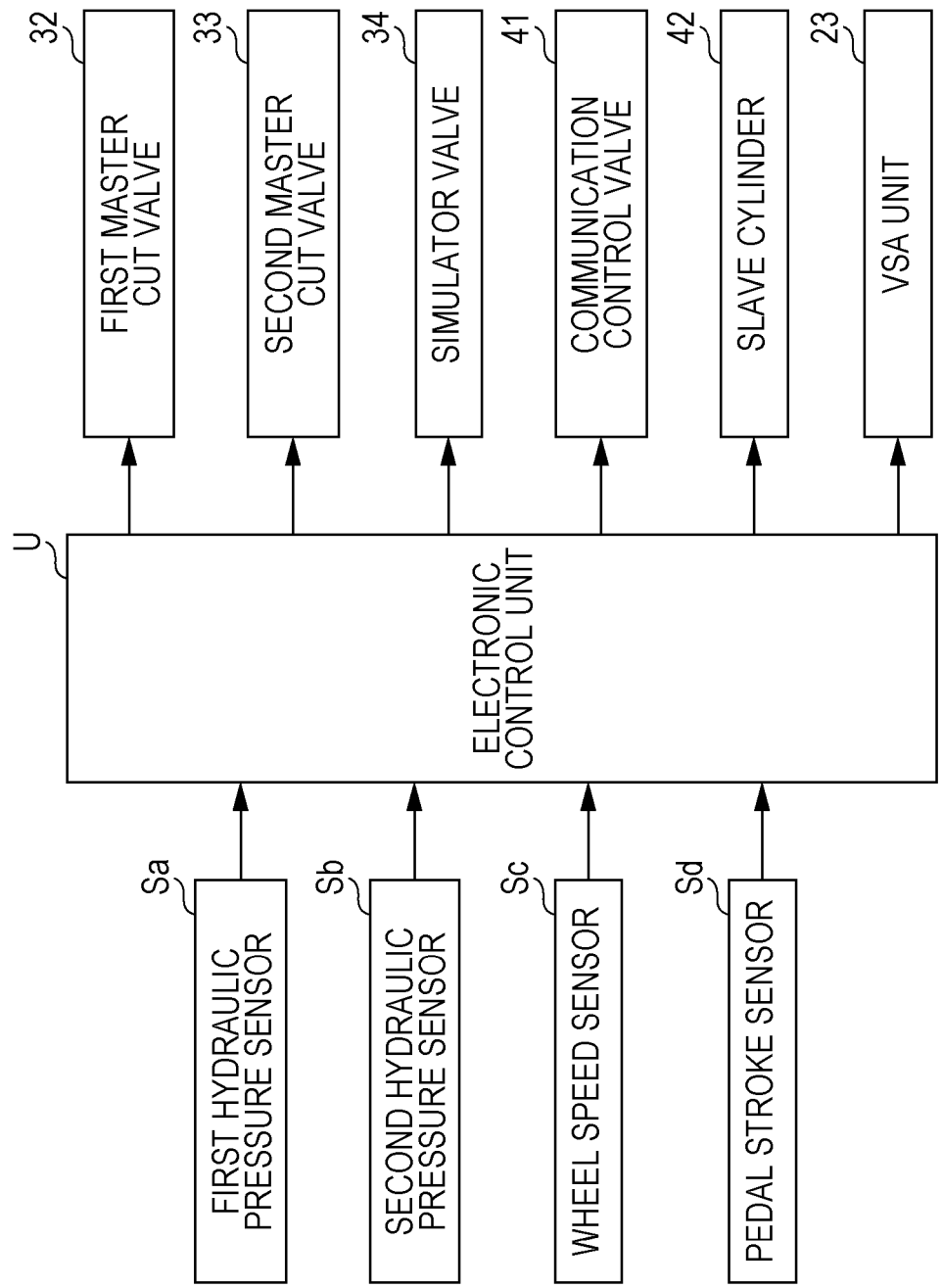
FIG. 2 is a block diagram of a control system according to the first exemplary embodiment.

As shown in FIGS. 1 and 2, in order to detect the hydraulic pressure of the fluid pathway Pa, a first hydraulic pressure sensor Sa is connected to the fluid pathway Pa. In addition, in order to detect the hydraulic pressure of the fluid pathway Qb, a second hydraulic pressure sensor Sb is connected to the fluid pathway Qb. An electronic control unit U has the first master cut valve 32, the second master cut valve 33, the simulator valve 34, the communication control valve 41, the slave cylinder 42, and the VSA unit 23 connected thereto. The first hydraulic pressure sensor Sa, the second hydraulic pressure sensor Sb, wheel speed sensors Sc for detecting the speed of the wheels, and a pedal stroke sensor Sd for detecting the stroke of the brake pedal 12 are connected to the electronic control unit U.

The operation of the present exemplary embodiment of the present invention having such a configuration is described next.

Figure 3:
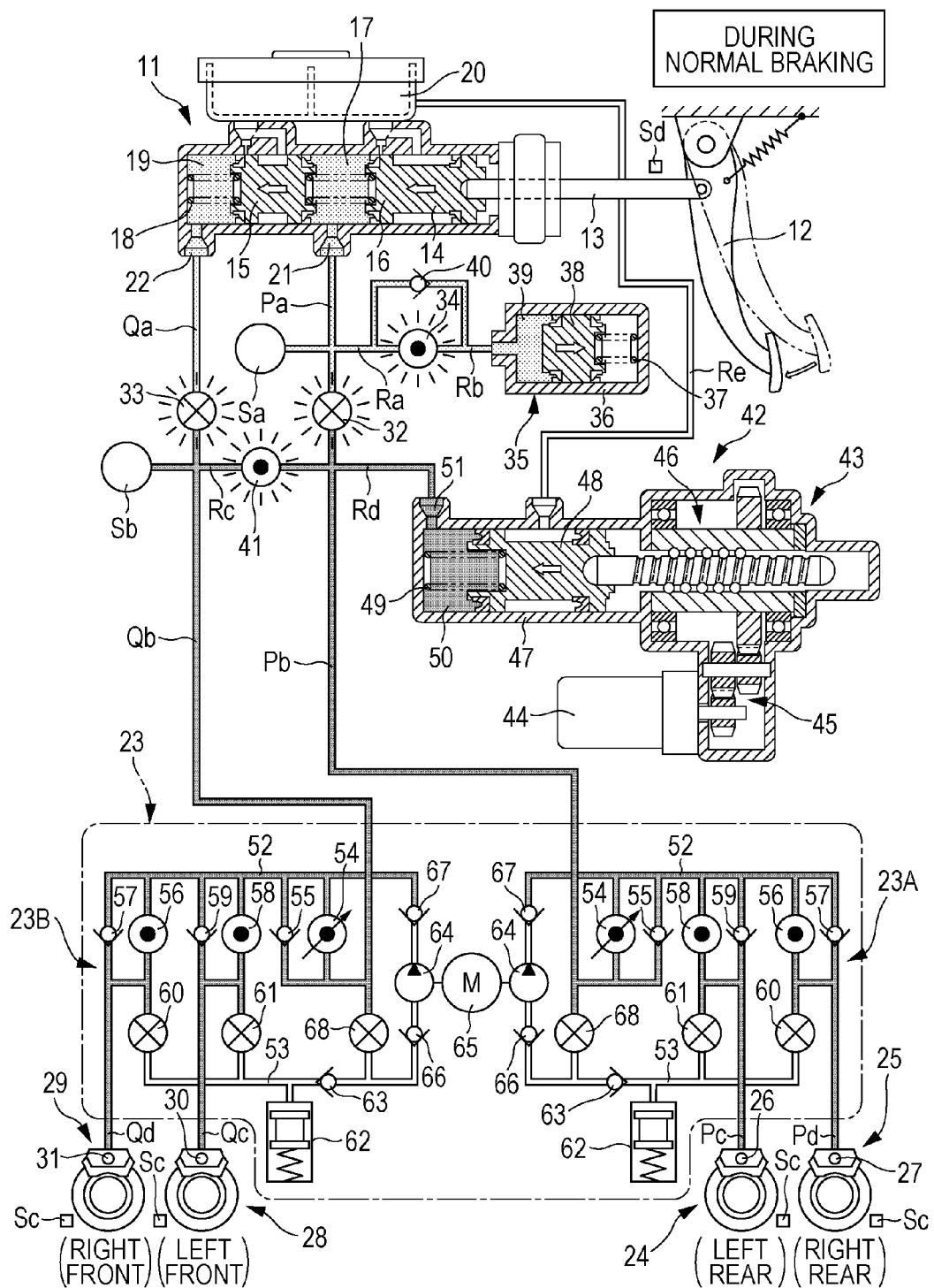
FIG. 3 is a diagram illustrating an exemplary operation performed in the case of normal braking according to the first exemplary embodiment.

A normal braking operation performed at a normal time is described first with reference to FIG. 3.

If the first hydraulic pressure sensor Sa disposed in the fluid pathway Pa detects depression of the brake pedal 12 performed by a driver under a normal condition in which the system normally operates, the first master cut valve 32 and the second master cut valve 33 formed as normally open solenoid valves are excited and closed. In contrast, the simulator valve 34 formed as a normally closed solenoid valve is excited and is made open. In addition, the communication control valve 41 formed as a normally closed solenoid valve is excited and is made open. At the same time, the actuator 43 of the slave cylinder 42 operates and, thus, the piston 48 moves forward. In this way, brake hydraulic pressure is generated in the hydraulic pressure chamber 50. At that time, since the communication control valve 41 formed as a normally closed solenoid valve is excited and is made open, the brake hydraulic pressure generated by the slave cylinder 42 is transferred to the fluid pathway Pb and the fluid pathway Qb connected to the fluid pathway Pb via the third fluid pathway Rc. Furthermore, the brake hydraulic pressure is transferred from the fluid pathways Pb and Qb to the wheel cylinders 26 and 27 of the disc brake units 24 and 25 and the wheel cylinders 30 and 31 of the disc brake units 28 and 29 via the open in-valves 56 and 56 and the open in-valves 58 and 58 of the VSA unit 23. In this way, the wheels are braked.

In addition, since the simulator valve 34 formed as a normally closed solenoid valve is excited and opened, the brake hydraulic pressure generated by the first hydraulic pressure chamber 17 of the master cylinder 11 is transferred to the hydraulic pressure chamber 39 of the stroke simulator 35 via the simulator valve 34 that is open. Thus, the brake hydraulic pressure moves the piston 38 against the force biased by the spring 37. Accordingly, a stroke of the brake pedal 12 is allowed, and a simulated pedal reaction force is generated. In this way, any unpleasant sensation can be eliminated for the driver.

By controlling the operation of the actuator 43 of the slave cylinder 42 so that the brake hydraulic pressure generated by the slave cylinder 42 and detected by the second hydraulic pressure sensor Sb disposed in the fluid pathway Qb has a magnitude in accordance with the magnitude of the brake hydraulic pressure generated by the master cylinder 11 and detected by the first hydraulic pressure sensor Sa disposed in the fluid pathway Pa, braking forces can be generated in the rear disc brake units 24 and 25 and the front disc brake units 28 and 29 in accordance with the amount of operation input to the brake pedal 12 by the driver.

Note that the operation of the actuator 43 of the slave cylinder 42 can be controlled on the basis of a target hydraulic pressure computed by the electronic control unit U instead of the amount of operation of the brake pedal 12.

An exemplary operation performed by the VSA unit 23 is described next.

When the VSA unit 23 does not operate, the regulator valves 54 are demagnetized and are made open, and the suction valve 68 are demagnetized and are closed. In addition, the in-valves 56 and the in-valves 58 are demagnetized and are made open, and the out-valves 60 and the out-valves 61 are demagnetized and are closed. Accordingly, when the driver presses the brake pedal 12 in order to perform braking and if the slave cylinder 42 operates, the brake hydraulic pressure output from the output port 51 of the slave cylinder 42 is supplied from the regulator valves 54 to the wheel cylinders 26 and 27 and the wheel cylinders 30 and 31 via the open in-valves 56 and the open in-valves 58. Thus, the four wheels can be braked.

In contrast, when the VSA unit 23 is operating, the suction valves 68 are excited and are made open. At that time, the pumps 64 are driven by the electric motor 65. Brake fluid is drawn from the slave cylinder 42 via the suction valves 68 and is pressurized by the pumps 64. The brake fluid is supplied to the regulator valves 54, the in-valves 56, and the in-valves 58. Accordingly, by exciting the regulator valves 54 and adjusting the opening of the regulator valves 54, the brake hydraulic pressure in the fluid pathways 52 can be adjusted. In addition, by selectively supplying the brake hydraulic pressure to the wheel cylinders 26 and 27 and the wheel cylinders 30 and 31 via the in-valves 56 and the in-valves 58 that are open, the braking forces of the four wheels can be independently controlled even when the driver does not press the brake pedal 12.

Therefore, by independently controlling the braking forces for the four wheels using the first brake actuator 23A and the second brake actuator 23B, the turning performance can be increased (if the braking force for a turning inner wheel is increased) or the directional stability can be increased (if the braking force for a turning outer wheel is increased).

In addition, when a driver presses the brake pedal 12 and performs braking and if, for example, locking of the left rear wheel on a low-friction road surface is detected on the basis of the outputs of the wheel speed sensors Sc, one of the in-valves 58 of the first brake actuator 23A is excited and closed while one of the out-valves 61 is excited and is made open. Thus, the brake hydraulic pressure of the wheel cylinder 26 for the left rear wheel is released to the reservoir 62 and is decreased to a predetermined pressure. Thereafter, the out-valve 61 is demagnetized and closed. In this way, the brake hydraulic pressure of the wheel cylinder 26 for the left rear wheel is maintained. If, as the result, the locking of the left rear wheel caused by the wheel cylinder 26 is unlocked, the in-valve 58 is demagnetized and is made open. Thus, the brake hydraulic pressure is supplied from the output port 51 of the slave cylinder 42 to the wheel cylinder 26 for the left rear wheel, and the pressure of the wheel cylinder 26 is increased to a predetermined pressure. In this way, the braking force is increased.

If locking of the left rear wheel occurs again due to the increase in the pressure, the above-described decrease in the pressure, maintaining of the pressure, and increase in the pressure are repeated. Thus, anti-lock braking system (ABS) control for minimizing a braking distance while preventing locking of the left rear wheel can be provided.

While the ABS control performed when locking of the left rear wheel caused by the wheel cylinder 26 occurs has been described, ABS control can be performed in the same manner when locking of the right rear wheel caused by the wheel cylinder 27 occurs, locking of the left front wheel caused by the wheel cylinder 30 occurs, or locking of the right front wheel caused by the wheel cylinder 31 occurs.

Note that according to the present exemplary embodiment, even in a normal braking operation illustrated in FIG. 3, the slave cylinder 42 and/or the VSA unit 23 operate in accordance with the depression level of the brake pedal 12 operated by a driver, and the brake hydraulic pressure is generated. That is, in accordance with the depression level of the brake pedal 12, the operation in which the slave cylinder 42 operates can be switched to the operation in which the VSA unit 23 operates and vice versa.

Figure 7:
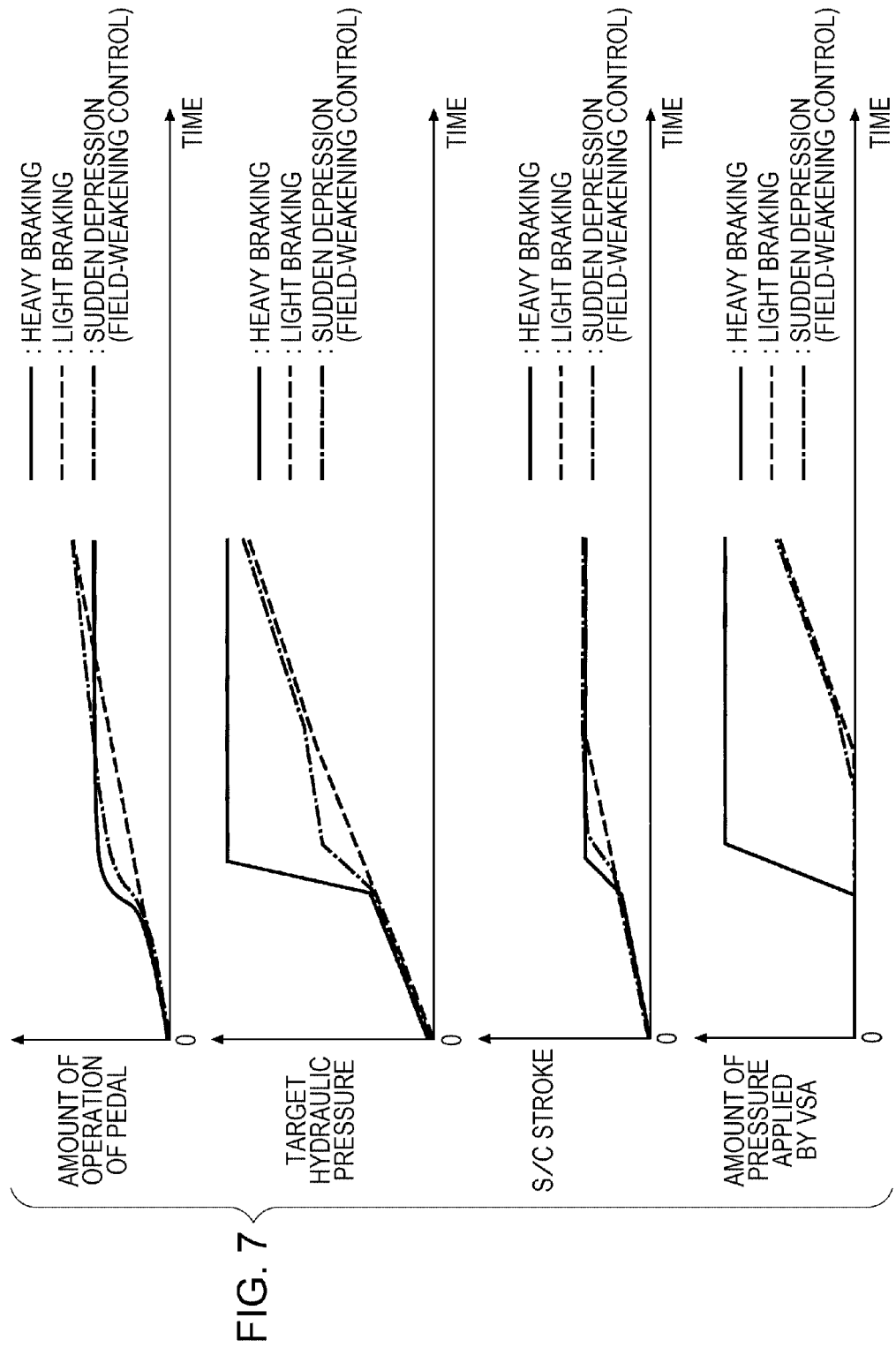
FIG. 7 is a graph illustrating exemplary operations performed by a slave cylinder and a VSA unit in accordance with the level of depression of a brake pedal according to the first exemplary embodiment.

FIG. 7 illustrates variations in an amount of operation of the brake pedal 12 detected by the pedal stroke sensor Sd, a target brake hydraulic pressure computed using the amount of operation, the stroke of the slave cylinder 42, and the amount of pressure applied by the VSA unit 23 over time. Solid lines indicate the variations occurring in the case of heavy braking. Dashed lines indicate the variations occurring in the case of light braking. Chain lines indicate the variations occurring when sudden depression is detected.

The heavy braking is distinguished from the sudden depression on the basis of a stroke of the brake pedal 12 detected by the pedal stroke sensor Sd. That is, when a variation in stroke over time is larger than or equal to a reference value and if the stroke is larger than or equal to a reference value, it is determined that heavy braking occurs. However, when a variation in a stroke over time is larger than or equal to the reference value and if the stroke is smaller than the reference value, it is determined that sudden depression occurs.

If a variation in stroke over time is smaller than the reference value and, therefore, it is determined that neither heavy braking nor sudden depression occurs, that is, if light braking occurs, only the slave cylinder 42 operates and generates the target brake hydraulic pressure. At that time, the target brake hydraulic pressure slowly increases. Accordingly, even when a small, low-cost electric motor is used as the electric motor 44 of the slave cylinder 42, the responsiveness of generation of the brake hydraulic pressure does not decrease.

When it is determined that sudden depression of the brake pedal 12 occurs and if a small electric motor is used as the electric motor 44 disposed in the slave cylinder 42, the responsiveness of generation of the brake hydraulic pressure performed by the electric motor 44 may be decreased. However, by performing field-weakening control on the electric motor 44 and increasing the rotational speed of the electric motor 44 to a rotational speed higher than the normal speed, the decrease in the responsiveness obtained when it is determined that sudden depression occurs can be prevented.

As described above, when it is determined that light braking or sudden depression occurs, the VSA unit 23 is not operated and only the slave cylinder 42 is operated in order to generate the brake hydraulic pressure. Accordingly, the target brake hydraulic pressure can be accurately and silently generated using the slave cylinder 42 while preventing the occurrence of vibration and noise caused by the operation performed by the VSA unit 23.

Note that even in the case of light braking or sudden depression, if the final stroke of the brake pedal 12 increases and, therefore, the target brake hydraulic pressure exceeds a threshold value (e.g., 10 MPa), the slave cylinder 42 including the small electric motor 44 cannot generate the target brake hydraulic pressure. In such a case, the operation performed by the slave cylinder 42 is stopped and the VSA unit 23 is operated. Thus, the target brake hydraulic pressure is generated using the VSA unit 23.

That is, if the heavy braking is detected in an emergency case, such as collision avoidance, the operation performed by the slave cylinder 42 is stopped, that is, a forward movement of the piston 48 is stopped by stopping supply of an electric current to the electric motor 44. At the same time, the VSA unit 23 is operated. In this way, all the target brake hydraulic pressure is generated by the VSA unit 23. The VSA unit 23 has a responsiveness of generation of the brake hydraulic pressure significantly higher than that of the slave cylinder 42 that generates the brake hydraulic pressure by moving forward the piston 48 using the electric motor 44. Accordingly, the VSA unit 23 can rapidly raise the brake hydraulic pressure in an emergency case and provide heavy braking. Note that if the VSA unit 23 operates, slight vibration and noise are inevitably generated. However, since such heavy braking rarely occurs, it does not cause any problem.

Figure 4:
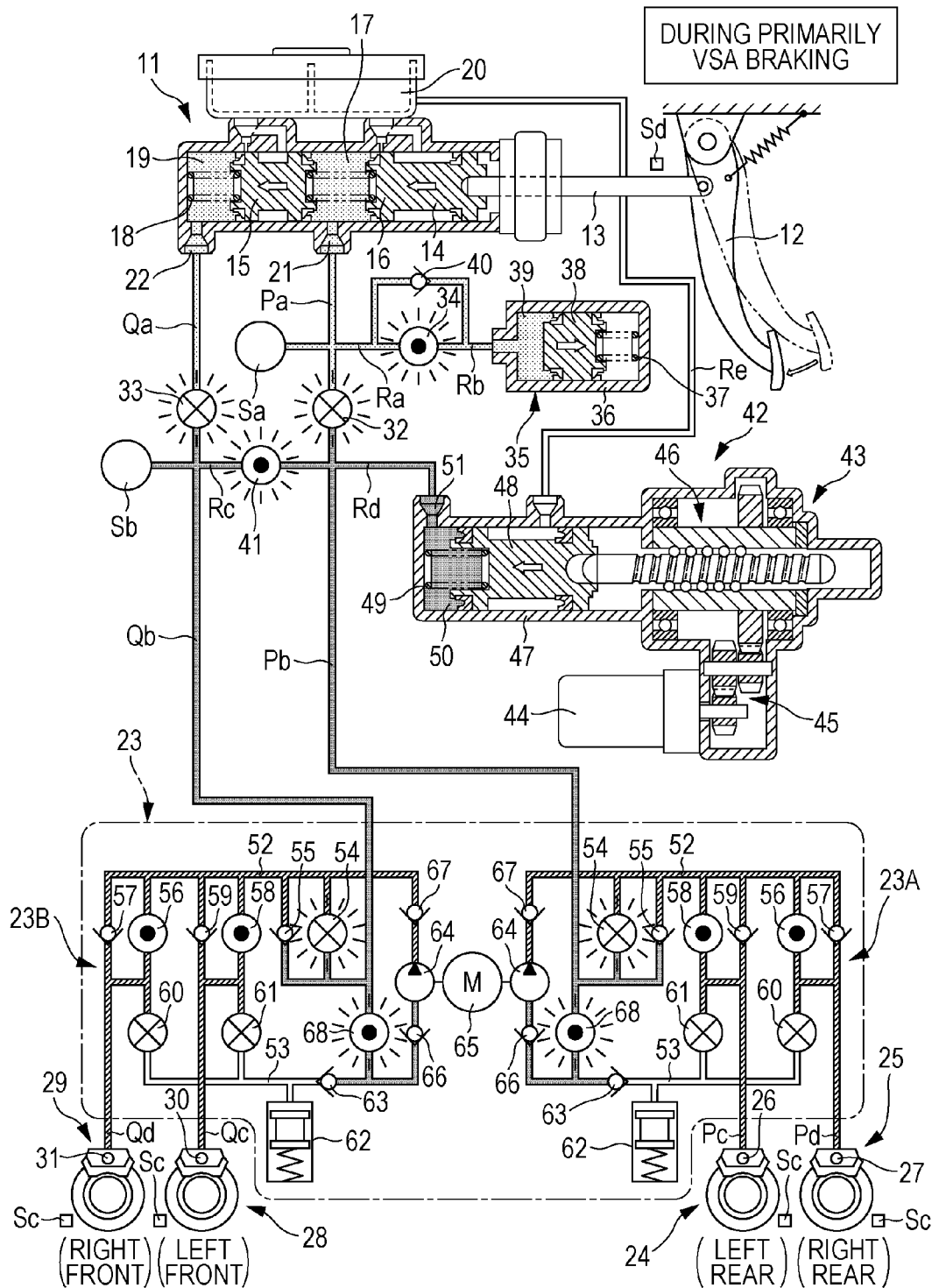
FIG. 4 is a diagram illustrating an exemplary operation performed in the case of VSA braking according to the first exemplary embodiment.

FIG. 4 illustrates the case in which the operation performed by the slave cylinder 42 is stopped due to heavy braking, that is, a forward movement of the piston 48 is stopped by stopping supply of an electric current to the electric motor 44, and the VSA unit 23 is operated. At that time, the regulator valves 54 of the VSA unit 23 are demagnetized and closed. The suction valves 68 are excited and are made open. The brake hydraulic pressure drawn from the slave cylinder 42 into the pumps 64 via the suction valves 68 is supplied to the wheel cylinders 26 and 27 and the wheel cylinders 30 and 31 via the in-valves 56 and the in-valves 58 that are made open.

In this state, the brake hydraulic pressure generated by the pumps 64 is released to the slave cylinder 42 by controlling the opening of the regulator valves 54. In this way, control is performed so that the brake hydraulic pressure is generated in accordance with the amount of operation of the brake pedal 12 or the target hydraulic pressure required from the outside. When the brake hydraulic pressure is drawn from the slave cylinder 42 by operating the pumps 64, the actuator 43 does not operate. Only the piston 48 moves forward due to negative pressure, and the brake fluid is supplied to the VSA unit 23.

Figure 5:
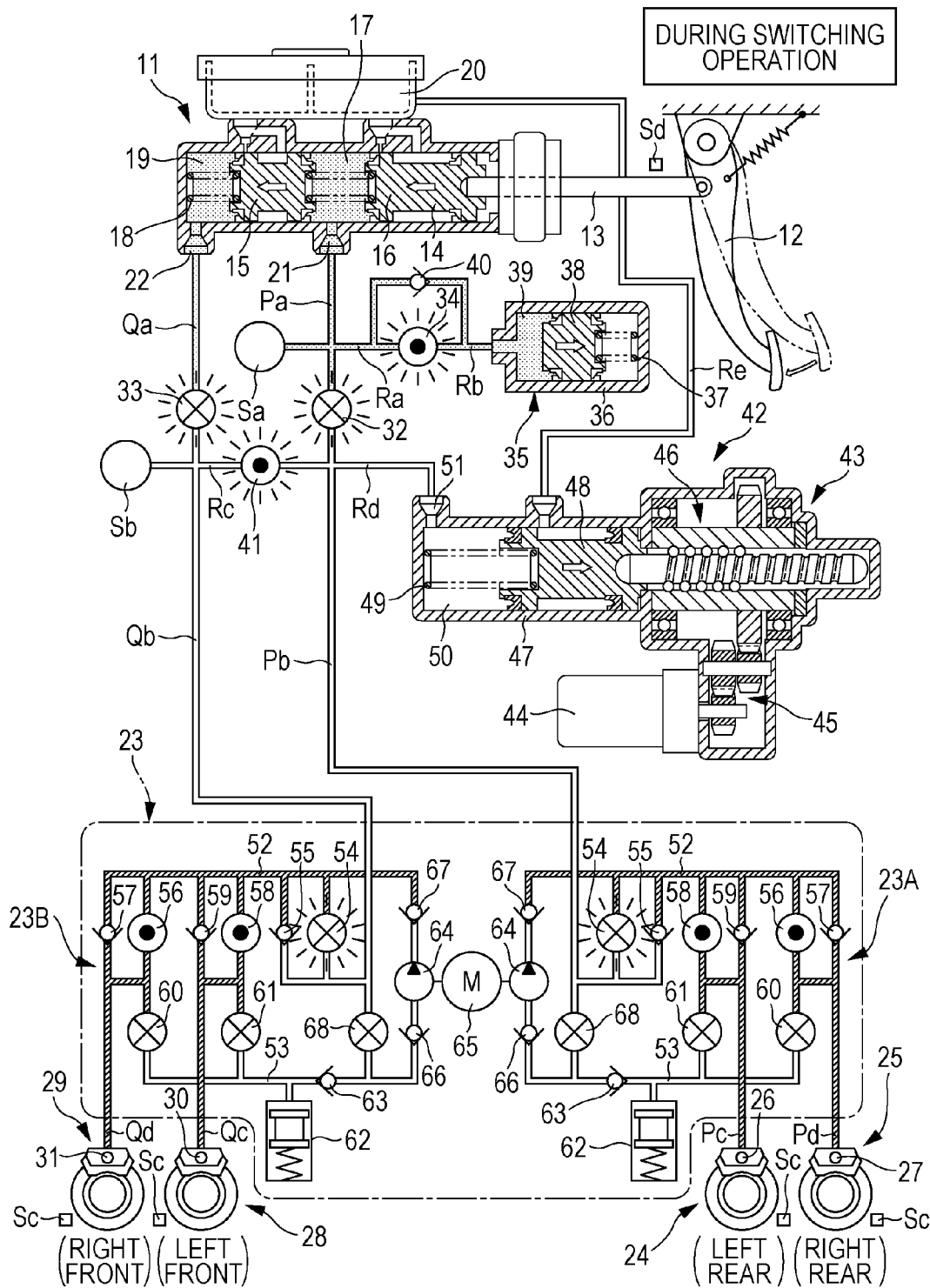
FIG. 5 illustrates an exemplary operation performed when switching occurs according to the first exemplary embodiment.

FIG. 5 illustrates the case in which generation of the brake hydraulic pressure performed by the slave cylinder 42 is switched to generation of the brake hydraulic pressure performed by the VSA unit 23. When the normal braking state illustrated in FIG. 3 is switched to the heavy braking state illustrated in FIG. 4, the operation performed by the slave cylinder 42 is stopped. Accordingly, the brake hydraulic pressure in the wheel cylinders 26 and 27 and the wheel cylinders 30 and 31 may leak out to the slave cylinder 42 via the regulator valves 54. Therefore, the braking force of the wheel cylinders 26 and 27 and the wheel cylinders 30 and 31 may be instantaneously lost. However, as illustrated in FIG. 5, by exciting and closing the regulator valves 54 in advance before the operation performed by the slave cylinder 42 stops, leakage of the brake hydraulic pressure of the wheel cylinders 26 and 27 and the wheel cylinders 30 and 31 toward the slave cylinder 42 can be prevented.

In addition, when the brake pedal 12 returns to the original position from the state in which the amount of operation of the brake pedal 12 exceeds a first threshold value and the VSA unit 23 operates and if the amount of operation of the brake pedal 12 becomes smaller than a second threshold value that is greater than the first threshold value, the braking operation performed by the VSA unit 23 is stopped and is switched to a braking operation using the slave cylinder 42. In this way, accurate control performed by the slave cylinder 42 is promptly resumed and, therefore, a brake feel can be improved.

Figure 8:
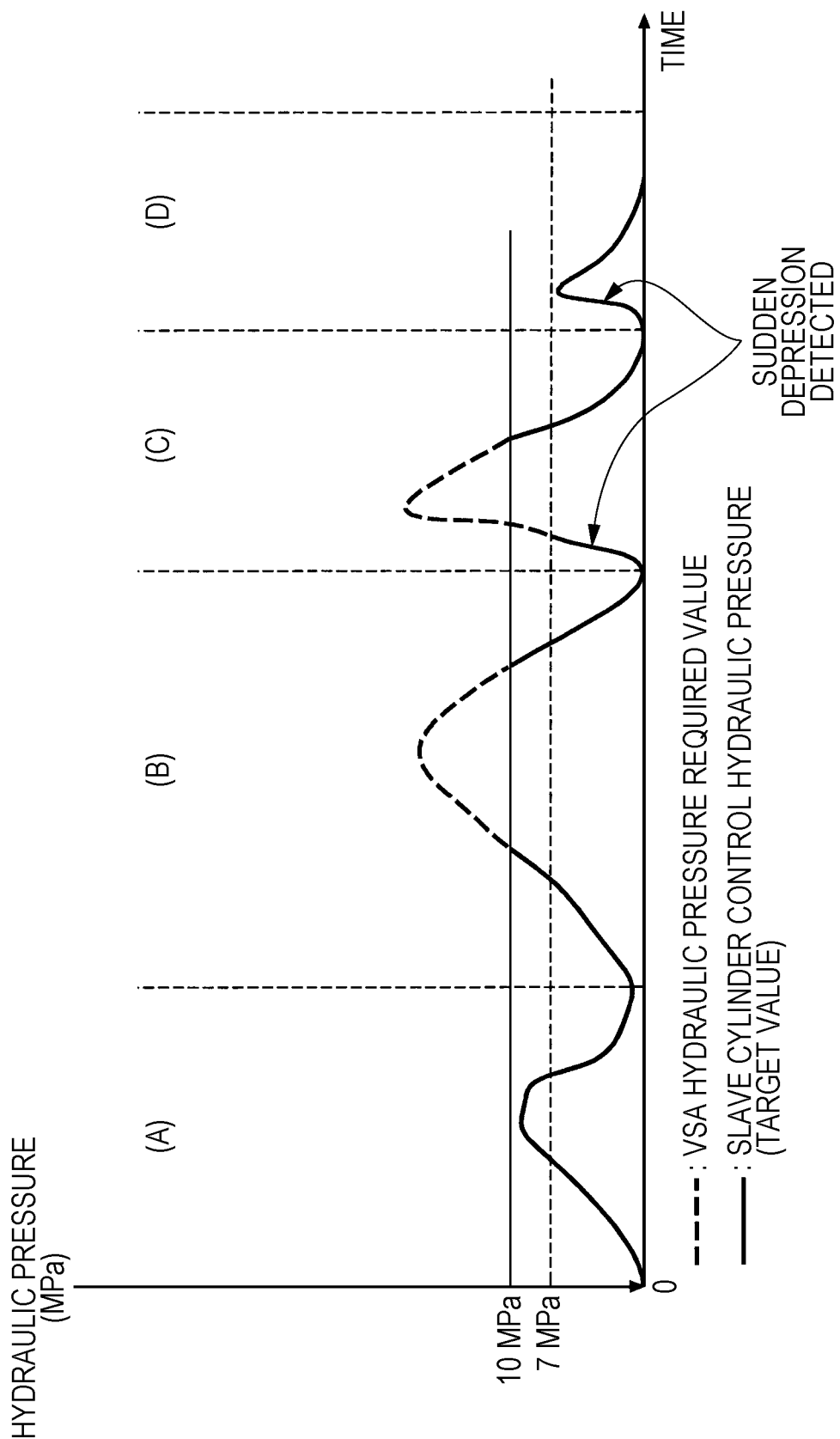
FIG. 8 is a timing diagram illustrating the exemplary operations performed by the slave cylinder and the VSA unit according to the first exemplary embodiment.

FIG. 8 is a timing diagram illustrating an example of the above-described operations. In the area (A), neither heavy braking nor sudden depression is detected, and the target brake hydraulic pressure is smaller than or equal to the first threshold value (e.g., 10 MPa). Accordingly, only the slave cylinder 42 operates. In the area (B), neither heavy braking nor sudden depression is detected. However, the target brake hydraulic pressure is larger than the first threshold value. Accordingly, the VSA unit 23 operates in addition to the slave cylinder 42. In this way, the brake hydraulic pressure that cannot be generated by only the slave cylinder 42 is generated by the VSA unit 23.

In the area (C), sudden depression is detected. In addition, since a maximum brake hydraulic pressure exceeds the second threshold value (e.g., 7 MPa) that is less than the first threshold value, it is determined that heavy braking occurs. Thus, when the brake hydraulic pressure generated by the slave cylinder 42 exceeds the second threshold value, the operation performed by the slave cylinder 42 is stopped, and only the VSA unit 23 generates the target brake hydraulic pressure. In the area (D), it is determined that sudden depression occurs. Since, at that time, a maximum brake hydraulic pressure does not exceed the second threshold value, the VSA unit 23 is not operated. Thus, only the slave cylinder 42 generates the target brake hydraulic pressure. A difference between the second threshold value and the first threshold value can be changed in accordance with the speed of depression of the brake pedal 12.

Figure 9:
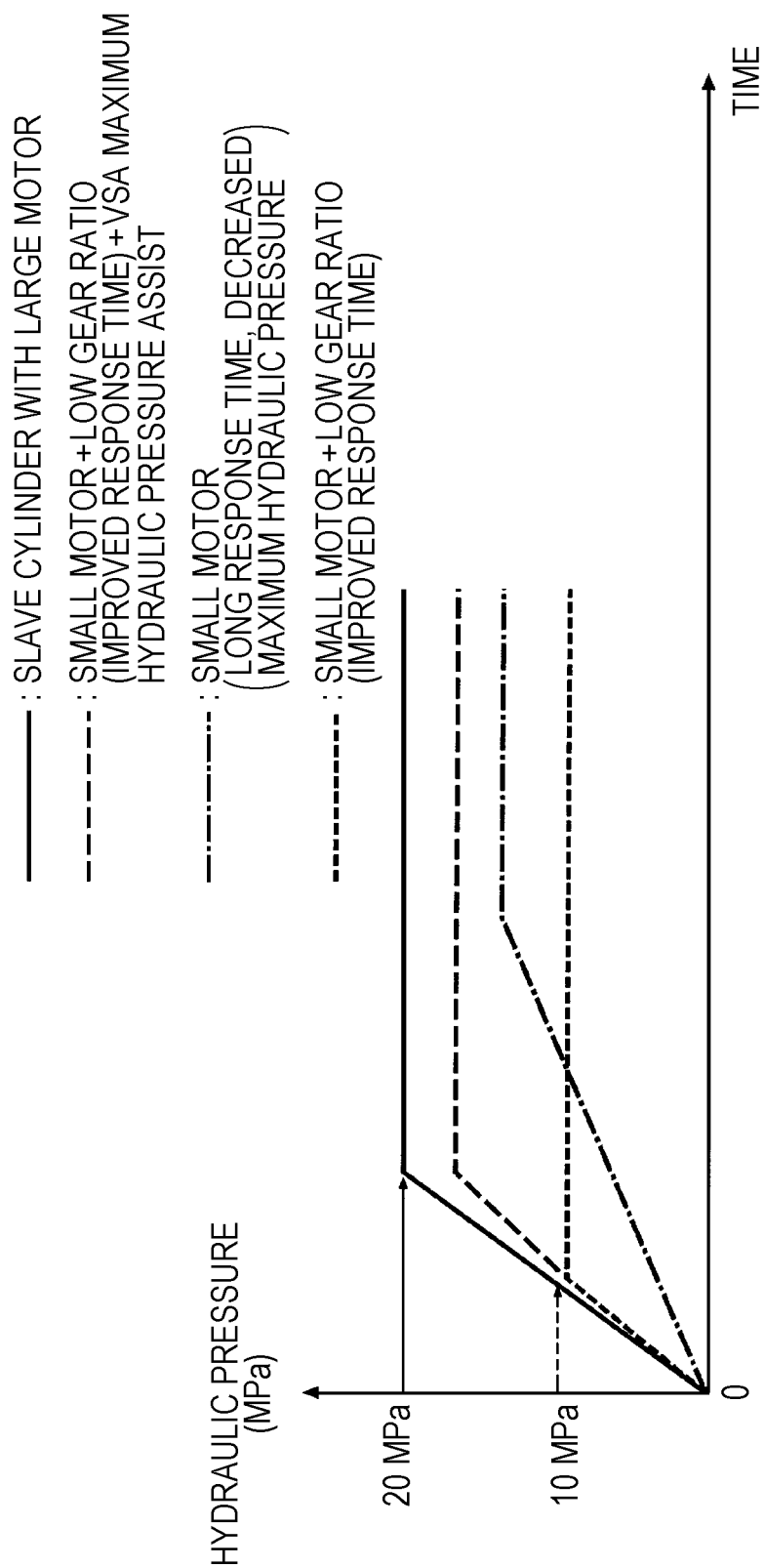
FIG. 9 is a graph illustrating advantages of the first exemplary embodiment of the present invention.

The solid line in FIG. 9 indicates the case in which a large electric motor having a sufficient output power is used as the electric motor 44 of the slave cylinder 42. The rise time (the responsiveness) of the brake hydraulic pressure is sufficiently short, and a maximum brake hydraulic pressure is sufficiently high. The chain line indicates the case in which a small electric motor is used as the electric motor 44 in order to reduce the manufacturing cost. The rise time of the brake hydraulic pressure is long, and a maximum brake hydraulic pressure is decreased. The dotted line indicates the case in which a small electric motor is used as the electric motor 44 and the gear ratio of the gear train 45 is reduced in order to compensate for the decrease in responsiveness. Although the responsiveness is improved, the maximum brake hydraulic pressure is further decreased.

The dashed line indicates the case according to the present exemplary embodiment. As can be seen from the graph indicated by the dashed line, by employing a small electric motor as the electric motor 44 for cost reduction and using the VSA unit 23 together with the electric motor 44, the responsiveness and the maximum brake hydraulic pressure that are substantially the same as those of the slave cylinder 42 (refer to the value indicated by the solid line) using a large electric motor as the electric motor 44 can be obtained.

Figure 6:
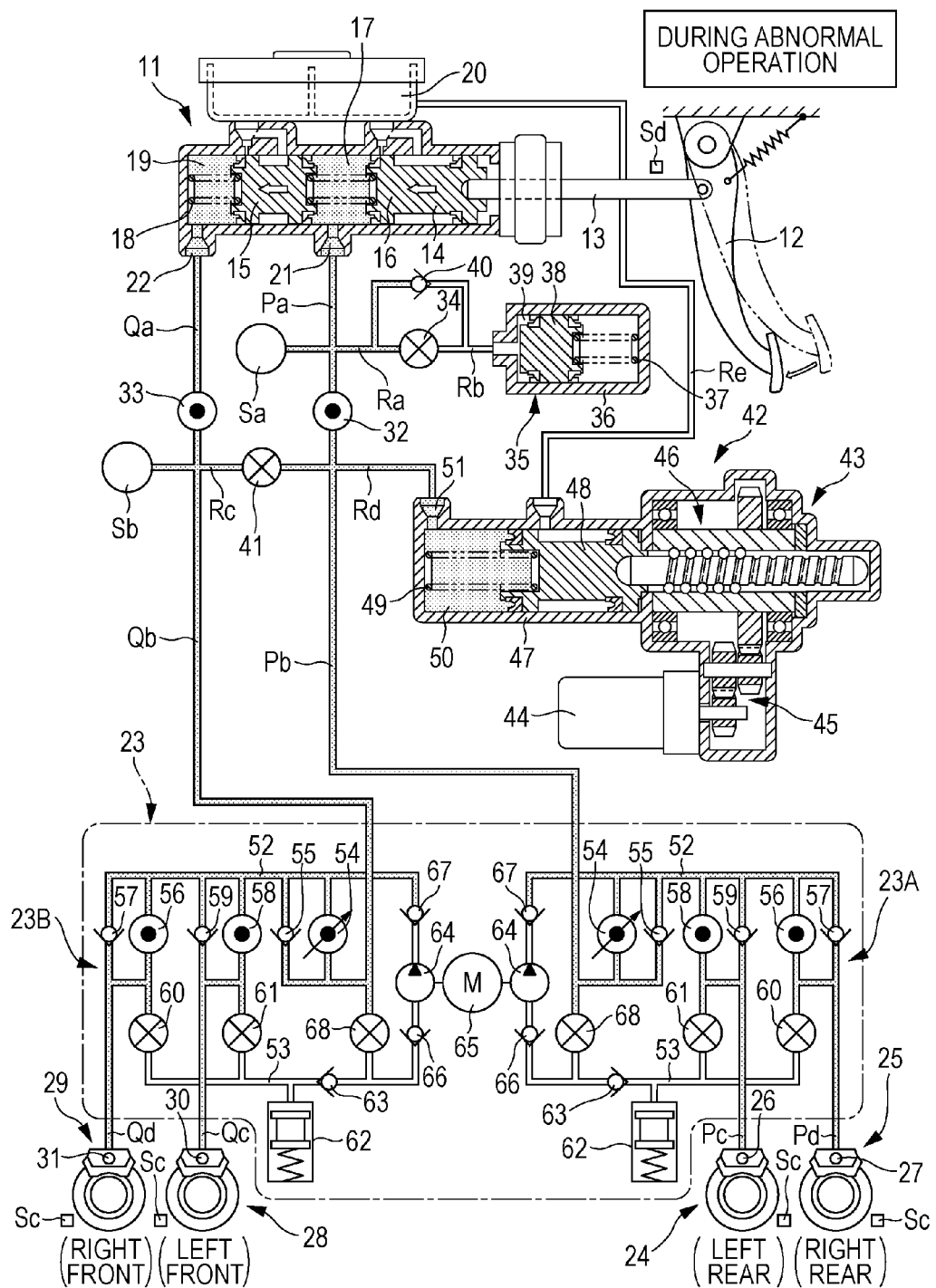
FIG. 6 illustrates an exemplary operation performed in the abnormal case (in the case of power loss) according to the first exemplary embodiment.

An exemplary operation performed when the slave cylinder 42 becomes inoperable due to, for example, loss of power is described next with reference to FIG. 6.

If power loss occurs, the first master cut valve 32 and the second master cut valve 33 formed as normally open solenoid valves automatically open, and the simulator valve 34 and the communication control valve 41 formed as normally closed solenoid valves automatically close. The in-valves 56, the in-valves 58, and the regulator valves 54 formed as normally open solenoid valves automatically open, and the out-valves 60, the out-valves 61, and the suction valves 68 formed as normally closed solenoid valves automatically close. In such a state, the brake hydraulic pressure generated in the first hydraulic pressure chamber 17 and the second hydraulic pressure chamber 19 of the master cylinder 11 is not absorbed by the stroke simulator 35. The brake hydraulic pressure passes through the first master cut valve 32, the second master cut valve 33, the regulator valves 54, the in-valves 56, and the in-valves 58 and operates the wheel cylinders 26 and 27 of the rear disc brake units 24 and 25 and the wheel cylinders 30 and 31 of the front disc brake units 28 and 29. Thus, a braking force can be generated without any problem.

At that time, if the brake hydraulic pressure generated by the master cylinder 11 acts on the hydraulic pressure chamber 50 of the slave cylinder 42 and, therefore, the piston 48 is retracted, the volume of the hydraulic pressure chamber 50 is increased and, therefore, the brake hydraulic pressure is decreased. In order to maintain the brake hydraulic pressure, the stroke of the brake pedal 12 may be increased. However, since retraction of the ball screw mechanism 46 of the slave cylinder 42 is prevented when a load is input in a direction from the piston 48, the increase in the volume of the hydraulic pressure chamber 50 is reduced. Note that in order to prevent an inappropriate operation of the slave cylinder 42, a member that prevents retraction of the piston 48 may be additionally provided. In such a case, it is desirable that a structure that does not increase the drive resistance be employed.

In addition, when power loss occurs, the communication control valve 41 closes and, therefore, the fluid pathways Pa to Pd of the first channel system is completely separated from the fluid pathways Qa to Qd of the second channel system. Accordingly, even when the fluid leaks out from one of the channel systems, the braking force can be maintained by using the other channel system. Thus, the redundancy can be further improved.

Note that if power loss occurs during depression of the brake pedal 12, the simulator valve 34 formed as a normally closed solenoid valve automatically closes. Thus, the brake fluid is trapped in the stroke simulator 35 and, therefore, the volume of the brake fluid may be insufficient. However, in such a case, the brake fluid in the stroke simulator 35 returns to the master cylinder 11 through the check valve 40. Thus, any problem does not arise.

Figure 10:
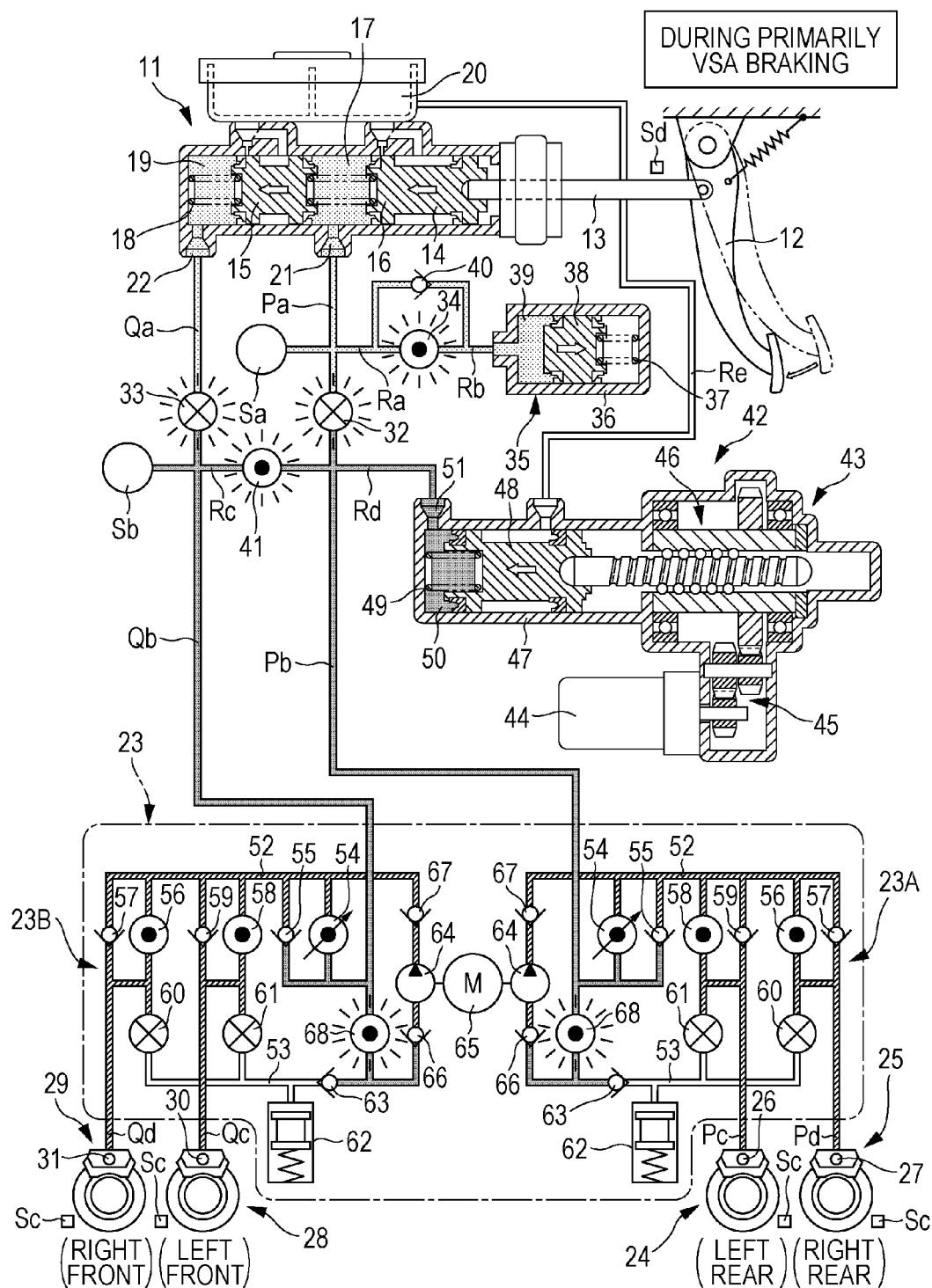
FIG. 10 is a diagram illustrating an exemplary operation performed in the case of VSA braking according to a second exemplary embodiment.

In addition, as indicated by a second exemplary embodiment illustrated in FIG. 10, when the VSA unit 23 is operated, the VSA unit 23 may be operated with the slave cylinder 42 being operated with a constant maximum driving force in order to maximize the amount of a forward movement of the piston 48. In this way, suction of the fluid performed by the pumps 64 can be facilitated using the brake fluid of the slave cylinder 42. Alternatively, the VSA unit 23 may be operated with the slave cylinder 42 driven so that the piston 48 is located at the bottom dead center.

FIG. 10 illustrates the initial phase of the operation performed by the VSA unit 23. By driving the slave cylinder 42 using a maximum driving force with the suction valves 68 being open, the brake fluid can be supplied to the VSA unit 23. Thereafter, the pumps 64 are operated, and the wheel cylinders 26 and 27 and the wheel cylinders 30 and 31 are pressurized. In this way, the wheel cylinders 26 and 27 and the wheel cylinders 30 and 31 can be pressurized so that a significantly high responsiveness is obtained. Furthermore, in the middle phase and the later phase of the operation performed by the VSA unit 23, by adjusting the opening of the regulator valves 54, part of the brake fluid ejected from the pumps 64 returns to the slave cylinder 42. Thus, the piston 48 of the slave cylinder 42 returns to the position located in the normal braking illustrated in FIG. 3.

As described above, by driving the slave cylinder 42 with a maximum driving force in the initial phase of the operation performed by the VSA unit 23, suction of the fluid is facilitated when the VSA unit 23 operates. Thus, the responsiveness of application of pressure can be increased in the initial phase of the operation performed by the VSA unit 23. In addition, when a pressure operation using only the slave cylinder 42 resumes after the VSA unit 23 has completed the pressure operation, the electric motor 44 of the slave cylinder 42 has already been powered on so as to be ready for the pressure operation. Accordingly, the movement of the piston 48 can be promptly started and, therefore, an abrupt change in the brake hydraulic pressure can be prevented.

Figure 11:
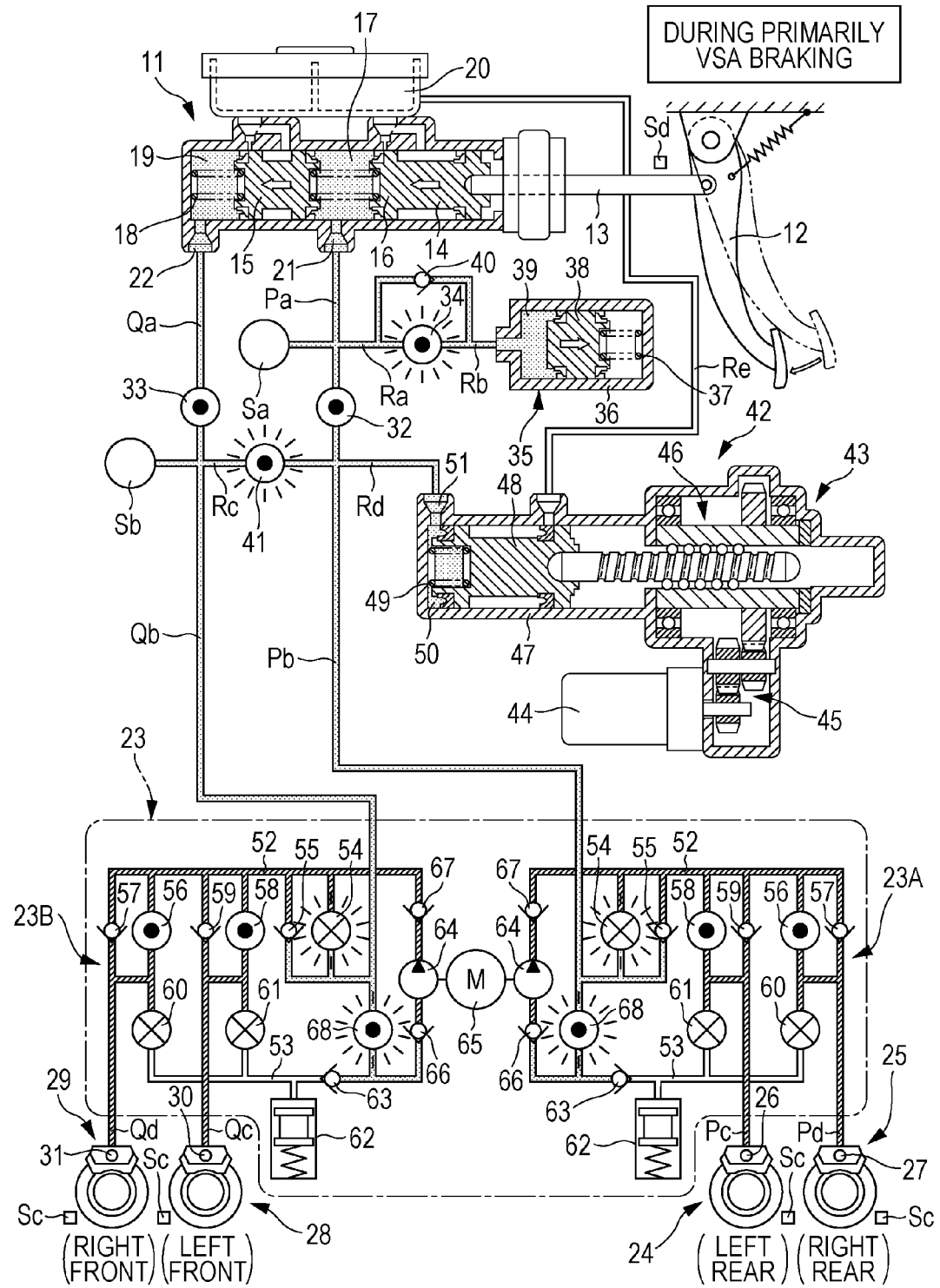
FIG. 11 is a diagram illustrating an exemplary operation performed in the case of VSA braking according to a third exemplary embodiment.

If, as in the second exemplary embodiment, the slave cylinder 42 is driven with a constant maximum driving force when the VSA unit 23 is operated, the pressurizing ability of the slave cylinder 42 needs to be set so as to be higher than the pressurizing ability of the VSA unit 23. Thus, the size of the slave cylinder 42 may be increased. In order to prevent the increase in the size of the slave cylinder 42, the brake fluid output from the master cylinder 11 may be used, as indicated by a third exemplary embodiment illustrated in FIG. 11.

That is, according to the third exemplary embodiment, when the VSA unit 23 is operated, the first master cut valve 32 and the second master cut valve 33 are demagnetized and are made open. In addition, the regulator valves 54 are excited and are closed. The suction valves 68 are excited and are made open. In this way, even when the slave cylinder 42 is small and has a small capacity of the fluid and, therefore, the piston 48 has bottomed out while being driven with a maximum driving force and, thus, a sufficient amount of the brake fluid cannot be supplied to the VSA unit 23, a sufficient braking force can be generated by the VSA unit 23 that receives the brake fluid from the master cylinder 11 when it is determined that heavy braking occurs in an emergency case, such as collision avoidance. According to the third exemplary embodiment, an increase in the size of the slave cylinder 42 can be prevented.

While the invention has been described in connection with exemplary embodiments, it is to be understood that various design changes can be made by those skilled in the art without departing from the spirit and scope of the invention.

For example, the amount of operation of the brake pedal 12 is not limited to a stroke according to the exemplary embodiments. For example, the magnitude of a force exerted on the pedal may be used as the amount of operation.

In addition, while the exemplary embodiments have been described with reference to determination as to whether field-weakening control of the electric motor 44 is performed or the VSA unit 23 is operated on the basis of the stroke of the brake pedal 12 (the target brake hydraulic pressure), the determination can be made using a variation in the stroke of the brake pedal 12 over time.

Furthermore, while the exemplary embodiments have been described with reference to the single hydraulic pressure chamber 50 of the slave cylinder 42 for the first and second brake channel systems, two independent hydraulic pressure chambers may be provided for the first and second brake channel systems.

According to an embodiment of the present invention, a vehicle braking system includes an operation amount detecting unit configured to detect an amount of operation of a brake pedal, a hydraulic pressure source configured to generate brake hydraulic pressure corresponding to the amount of operation detected by the operation amount detecting unit, a control unit configured to control an operation performed by the hydraulic pressure source, and a wheel cylinder that operates using the brake hydraulic pressure generated by the hydraulic pressure source. The hydraulic pressure source includes a first actuator that moves a piston forward using a driving force generated by an electric motor and generates the brake hydraulic pressure and a second actuator that pressurizes brake fluid located downstream of the first actuator using a pump, and the control unit selectively operates the first actuator and the second actuator on the basis of the amount of operation detected by the operation amount detecting unit. In this configuration, the size and weight of the electric motor can be reduced by operating the first actuator when a high responsiveness of generation of the brake hydraulic pressure is not required. In contrast, a high responsiveness can be obtained by operating the second actuator when a high responsiveness of generation of the brake hydraulic pressure is required. In addition, the reduction in the size and weight of the electric motor reduces a maximum load torque applied to the components of the vehicle braking system. Accordingly, the sizes and weights of the components of the vehicle braking system (including a gear box) can be reduced and, therefore, the cost of the vehicle braking system can be reduced. Note that as used herein, the term "selectively operating the first actuator and the second actuator" refers to "operating one of the first actuator and the second actuator" or "operating both of the first actuator and the second actuator".

The control unit can operate only the first actuator and pressurize the wheel cylinder until the amount of operation reaches a predetermined value. After the amount of operation has reached the predetermined value, the control unit can drive the first actuator with a certain amount of driving force and operate the second actuator so as to pressurize the wheel cylinder. In this configuration, a good brake feel can be maintained by operating only the first actuator until the amount of operation of the brake pedal reaches a predetermined value. In addition, a responsiveness of generation of the brake hydraulic pressure can be increased by driving the first actuator with a certain amount of driving force and operating the second actuator after the amount of operation of the brake pedal has reached the predetermined value.

The control unit can operate only the first actuator until the amount of operation reaches a predetermined value and pressurize the wheel cylinder. After the amount of operation has reached the predetermined value, the control unit can stop the forward movement of the piston of the first actuator and operate only the second actuator so as to pressurize the wheel cylinder. In this configuration, a good brake feel can be maintained by operating only the first actuator until the amount of operation of the brake pedal reaches a predetermined value. In addition, a responsiveness of generation of the brake hydraulic pressure can be increased by stopping the forward movement of the piston of the first actuator and operating only the second actuator after the amount of operation of the brake pedal has reached the predetermined value.

If one of a variation in the amount of operation of the brake pedal over time and a variation in a target hydraulic pressure over time is greater than a reference value, the control unit can drive the piston of the first actuator with a certain amount of driving force and operate the second actuator so as to pressurize the wheel cylinder. In this configuration, when a driver performs heavy braking on the brake pedal in an emergency situation, such as collision avoidance, a maximum brake hydraulic pressure can be generated and, therefore, a required responsiveness can be obtained.

If one of a variation in the amount of operation of the brake pedal over time and a variation in a target hydraulic pressure over time is greater than a reference value, the control unit can stop forward movement of the piston of the first actuator and operate only the second actuator so as to pressurize the wheel cylinder. In this configuration, when a driver performs heavy braking on the brake pedal in an emergency situation, such as collision avoidance, a required responsiveness can be obtained by operating only the second actuator.

The electric motor can have field weakening control capability, and the control unit can pressurize the wheel cylinder selectively using the first actuator under the field-weakening control and the second actuator on the basis of at least one of the amount of operation and the variation in the amount of operation over time. In this configuration, even when only the first actuator is operated, a maximum responsiveness can be obtained. Note that as used herein, the term "selectively using the first actuator and the second actuator" refers to "using one of the first actuator and the second actuator" or "using both of the first actuator and the second actuator".

The vehicle braking system can further include an on-off valve. When the operation performed by the first actuator is stopped and the second actuator is operated, the on-off valve can maintain pressure in the wheel cylinder. In this configuration, a temporary drop of the responsiveness caused by switching between the actuators can be prevented.

The vehicle braking system can further include a master cylinder configured to generate brake hydraulic pressure corresponding to the amount of operation of the brake pedal and a cutoff valve disposed between the master cylinder and each of the first actuator and the second actuator, where the cutoff valve cuts communication between the master cylinder and each of the first actuator and the second actuator. After one of the amount of operation and a target hydraulic pressure has reached a predetermined value, the control unit can open the cutoff valves with the first actuator and the second actuator being operated. In this configuration, even when the piston of the first actuator is located at the bottom dead center and, therefore, the pressurizing performance is maximized, a further pressure can be applied to the wheel cylinder using the brake hydraulic pressure generated by the master cylinder.

After one of the amount of operation and a target hydraulic pressure has reached a first predetermined value, the control unit can control the first actuator using a predetermined method that does not use one of the amount of operation and the target hydraulic pressure, and the control unit can control the second actuator using one of the amount of operation and the target hydraulic pressure. If one of the amount of operation and the target hydraulic pressure drops below a second predetermined value that is greater than the first predetermined value during a retuning time period, the control unit can drive only the first actuator in accordance with one of the amount of operation and the target hydraulic pressure. In this configuration, during a retuning time period during which the brake pedal is returned to the original position, pressurization provided by the second actuator is returned to pressurization provided by the first actuator having high accuracy at an early point. In this way, brake feel can be improved.

Note that a VSA unit 23 according to exemplary embodiments corresponds to the second actuator or the hydraulic pressure source. A slave cylinder 42 according to the exemplary embodiments corresponds to the first actuator or the hydraulic pressure source. A regulator valve 54 according to the exemplary embodiments corresponds to the on-off valve. A first master cut valve 32 and a second master cut valve 33 according to the exemplary embodiments correspond to cutoff valves. A pedal stroke sensor Sd according to the exemplary embodiments corresponds to the operation amount detecting unit. In addition, an electronic control unit U according to the exemplary embodiments corresponds to the control unit.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle braking system comprising:
an operation amount detector configured to detect an amount of operation of a brake pedal;
a hydraulic pressure source to generate brake hydraulic pressure corresponding to the amount of operation detected by the operation amount detector;
a controller configured to control an operation performed by the hydraulic pressure source;
a wheel cylinder to be operated by the brake hydraulic pressure generated by the hydraulic pressure source;
the hydraulic pressure source comprising:
a first actuator including a piston and an electric motor, the electric motor being configured to move the piston to generate the brake hydraulic pressure; and
a second actuator including a pump configured to pressurize brake fluid located downstream of the first actuator;
the controller being configured to selectively operate the first actuator and the second actuator based on the amount of operation detected by the operation amount detector, the controller being configured to control the first actuator and the second actuator to operate the wheel cylinder by the brake hydraulic pressure generated by one of the first actuator and the second actuator, and the controller being configured to control the first actuator and the second actuator to operate the wheel cylinder by the brake hydraulic pressures generated by both of the first actuator and the second actuator;
a master cylinder to generate brake hydraulic pressure corresponding to the amount of operation detected by the operation amount detector;
a first cutoff valve disposed between the master cylinder and the first actuator, the first cutoff valve being configured to cut communication between the master cylinder and the first actuator; and
a second cutoff valve disposed between the master cylinder and the second actuator, the second cutoff valve being configured to cut communication between the master cylinder and the second actuator,
wherein after one of the amount of operation detected by the operation amount detector and a target hydraulic pressure has reached a predetermined value, the controller opens the first and second cutoff valves with the first actuator and the second actuator being operated.

2. The vehicle braking system according to claim 1, wherein
the controller operates only the first actuator to pressurize the wheel cylinder until the amount of operation detected by the operation amount detector reaches the predetermined value, and
after the amount of operation detected by the operation amount detector has reached the predetermined value, the controller drives the first actuator with a certain amount of driving force and operates the second actuator to pressurize the wheel cylinder.

3. The vehicle braking system according to claim 1, wherein
the controller operates only the first actuator to pressurize the wheel cylinder until the amount of operation detected by the operation amount detector reaches the predetermined value, and
after the amount of operation detected by the operation amount detector has reached the predetermined value, the controller stops a forward movement of the piston of the first actuator and operates only the second actuator to pressurize the wheel cylinder.

4. The vehicle braking system according to claim 1, wherein
if one of a variation per unit time in the amount of operation detected by the operation amount detector and a variation per unit time in a target hydraulic pressure is greater than a reference value, the controller drives the piston of the first actuator with a certain amount of driving force and operates the second actuator to pressurize the wheel cylinder.

5. The vehicle braking system according to claim 1, wherein
if one of a variation per unit time in the amount of operation detected by the operation amount detector and a variation per unit time in a target hydraulic pressure is greater than a reference value, the controller stops a forward movement of the piston of the first actuator and operates only the second actuator to pressurize the wheel cylinder.

6. The vehicle braking system according to claim 1, wherein
the electric motor has field weakening control capability, and
the controller pressurizes the wheel cylinder by selectively operating the first actuator under a field-weakening control and the second actuator based on at least one of the amount of operation detected by the operation amount detector and the variation per unit time in the amount of operation detected by the operation amount detector.

7. The vehicle braking system according to claim 1, further comprising:
an on-off valve to maintain pressure in the wheel cylinder when an operation performed by the first actuator is stopped and the second actuator is operated.

8. The vehicle braking system according to claim 1, wherein
after one of the amount of operation detected by the operation amount detector and a target hydraulic pressure has reached a first predetermined value, the controller controls the first actuator using a predetermined method based on information other than one of the amount of operation detected by the operation amount detector and the target hydraulic pressure, and the controller controls the second actuator using one of the amount of operation detected by the operation amount detector and the target hydraulic pressure, and
if one of the amount of operation detected by the operation amount detector and the target hydraulic pressure drops below a second predetermined value that is greater than the first predetermined value, the controller drives only the first actuator in accordance with one of the amount of operation detected by the operation amount detector and the target hydraulic pressure, the second predetermined value being based on a value during the brake pedal is returned to an original position.

9. The vehicle braking system according to claim 4, wherein
    the controller is configured to compute the target hydraulic pressure based on the amount of operation detected by the operation amount detector.

10. The vehicle braking system according to claim 1, wherein the predetermined value is reached when the target hydraulic pressure reaches a limit of the brake hydraulic pressure generated by the electric motor of the first actuator and the pump of the second actuator.

* * * * *